United States Patent
Yang

(10) Patent No.: US 9,686,310 B2
(45) Date of Patent: Jun. 20, 2017

(54) METHOD AND APPARATUS FOR REPAIRING A FILE

(71) Applicant: TENCENT TECHNOLOGY (SHENZHEN) COMPANY LIMITED, Shenzhen (CN)

(72) Inventor: Zuohui Yang, Shengzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 72 days.

(21) Appl. No.: 14/688,481

(22) Filed: Apr. 16, 2015

(65) Prior Publication Data

US 2015/0222645 A1 Aug. 6, 2015

Related U.S. Application Data

(63) Continuation of application No. PCT/CN2013/083966, filed on Sep. 23, 2013.

(30) Foreign Application Priority Data

Oct. 17, 2012 (CN) .......................... 2012 1 0393885

(51) Int. Cl.
*H04L 29/06* (2006.01)
*G06F 21/56* (2013.01)
(Continued)

(52) U.S. Cl.
CPC ........ *H04L 63/145* (2013.01); *G06F 17/3007* (2013.01); *G06F 21/56* (2013.01);
(Continued)

(58) Field of Classification Search
CPC ...... G06F 21/568; G06F 21/565; G06F 21/56; G06F 21/562
See application file for complete search history.

(56) References Cited

U.S. PATENT DOCUMENTS 5,475,826 A 12/1995 Fischer
5,613,002 A * 3/1997 Kephart ................ G06F 21/565
713/188
(Continued)

FOREIGN PATENT DOCUMENTS

CN 101246535 A 8/2008
CN 101359353 A 2/2009
(Continued)

OTHER PUBLICATIONS

Chinese Office Action issued Sep. 23, 2014 re: CN Application No. 201210393885.7; pp. 1-6.
(Continued)

*Primary Examiner* — Farid Homayounmehr
*Assistant Examiner* — Christopher C Harris
(74) *Attorney, Agent, or Firm* — Cantor Colburn LLP

(57) ABSTRACT

The present disclosure describes a method for repairing a file. A user device searches for a defect file corrupted by a virus file, obtains a virus file name of the virus file and transmits the virus file name to a server. The user device receives an indication transmitted by the server and generates first characteristic information according to the indication; wherein the indication includes information of positions of the defect file that will not be modified by the virus file. The user device transmits the first characteristic information to the server, such that the server obtains a repairing file corresponding to the first characteristic information. The user device replaces the defect file with the repairing file.

11 Claims, 5 Drawing Sheets

(51) Int. Cl.
*G06F 17/30* (2006.01)
*H04L 29/08* (2006.01)

(52) U.S. Cl.
CPC .......... *G06F 21/562* (2013.01); *G06F 21/565* (2013.01); *G06F 21/568* (2013.01); *H04L 67/10* (2013.01)

(56) References Cited

U.S. PATENT DOCUMENTS

| | | | |
|---|---|---|---|
| 7,272,724 B2 | 9/2007 | Tarbotton et al. | |
| 7,478,431 B1* | 1/2009 | Nachenberg | G06F 21/565 713/175 |
| 8,352,438 B1* | 1/2013 | Kennedy | G06F 21/568 707/674 |
| 8,621,625 B1* | 12/2013 | Bogorad | G06F 21/562 370/229 |
| 2002/0144129 A1* | 10/2002 | Malivanchuk | G06F 21/56 713/188 |
| 2002/0174137 A1* | 11/2002 | Wolff | G06F 21/568 |
| 2008/0047013 A1* | 2/2008 | Claudatos | G06F 21/562 726/24 |
| 2009/0300761 A1* | 12/2009 | Park | G06F 21/562 726/23 |
| 2010/0235916 A1* | 9/2010 | Radatti | G06F 21/56 726/24 |
| 2010/0262584 A1* | 10/2010 | Turbin | G06F 21/564 707/674 |
| 2011/0225128 A1* | 9/2011 | Jarrett | G06F 8/61 707/692 |
| 2011/0247071 A1* | 10/2011 | Hooks | G06F 21/567 726/24 |
| 2012/0144383 A1* | 6/2012 | Mishra | G06F 11/36 717/173 |
| 2012/0272320 A1* | 10/2012 | Rados | G06F 21/564 726/24 |
| 2013/0145471 A1* | 6/2013 | Richard | G06F 21/564 726/24 |

FOREIGN PATENT DOCUMENTS

| | | |
|---|---|---|
| CN | 101950336 A | 1/2011 |
| CN | 102592103 A | 7/2012 |
| JP | 4109285 B2 | 7/2008 |
| TW | 201113719 A | 4/2011 |

OTHER PUBLICATIONS

International Preliminary Report on Patentability and Written Opinion issued Apr. 21, 2015 re: Application No. PCT/CN2013/083966; pp. 1-8.
Taiwan Office Action issued Apr. 1, 2015 re: Application No. 102136430; pp. 1-9.
International Search Report issued Dec. 26, 2013 re: Application No. PCT/CN2013/083966; citing: CN 101246535 A, CN 102592103 A, JP 4109285 B2 and U.S. Pat. No. 7272724 B2.

* cited by examiner

US 9,686,310 B2

METHOD AND APPARATUS FOR REPAIRING A FILE

CROSS-REFERENCE TO RELATED APPLICATIONS

This application is a continuation of International Application No. PCT/CN2013/083966, filed on Sep. 23, 2013. This application claims the benefit and priority of Chinese Patent Application No. 201210393885.7, filed Oct. 17, 2012. The entire disclosures of each of the above applications are incorporated herein by reference.

FIELD

The present disclosure relates to security techniques, and more particularly, to a method and an apparatus for repairing a file.

BACKGROUND

Generally, when a file in a user device is infected with a virus file, the virus file will modify the file and add itself into the file. When the file infected with the virus file runs in the user device, the virus file in the file will also be executed. In order to kill the virus, conventional security software usually cleans the virus file in the file.

However, some virus files may corrupt a normal file in the user device seriously. Thus, even if the virus file is cleaned, the file cannot be used any more. This file becomes a defect file.

SUMMARY

According to an example of the present disclosure, a method for repairing a file is provided. The method includes:

searching a user device for a defect file corrupted by a virus file;

obtaining, by the user device, a virus file name of the virus file and transmitting the virus file name to a server;

receiving, by the user device, an indication transmitted by the server in response to the virus file name; wherein the indication includes information of positions of the defect file that will not be modified by the virus file;

generating, by the user device, first characteristic information according to the indication and transmitting the first characteristic information to the server, such that the server obtains a repairing file corresponding to the first characteristic information; and receiving, by the user device, the repairing file and replacing the defect file with the repairing file.

According to another example of the present disclosure, a method for repairing a file is provided. The method includes:

receiving, by a server, a virus file name transmitted by a user device;

determining, by the server, whether a defect file corrupted by a virus file corresponding to the virus file name can be repaired according to the virus file name;

if the defect file can be repaired, transmitting, by the server, an indication comprising information of positions of the defect file that will not be modified by the virus file to the user device;

receiving, by the server, first characteristic information from the user device, wherein the first characteristic information is generated according to information retrieved from positions corresponding to the information in the indication of the defect file;

determining, whether the first characteristic information is consistent with second characteristic information of a repairing file; and if the first characteristic information is consistent with the second characteristic information, providing, by the server, a downloading path of the repairing file or providing the repairing file to the user device.

According to another example of the present disclosure, a user device for repairing a file is provided. The user device includes:

one or more processors;

memory; and one or more program modules stored in the memory and to be executed by the one or more processors, the one or more program modules include:

a searching module, to search the user device for a defect file corrupted by a virus file and obtain a virus file name of the virus file;

a first characteristic information obtaining module, to receive an indication from a server and generate first characteristic information according to the indication; wherein the indication includes information of positions of the defect file that will not be modified by the virus file;

a repairing file obtaining module, to obtain a repairing file corresponding to the first characteristic information, wherein the repairing file is provided by the server if the first characteristic information of the defect file is consistent with second characteristic information of the repairing file; and a replacing module, to replace the defect file with the repairing file.

Other aspects or embodiments of the present disclosure can be understood by those skilled in the art in light of the description, the claims, and the drawings of the present disclosure.

BRIEF DESCRIPTION OF THE DRAWINGS

Features of the present disclosure are illustrated by way of example and not limited in the following figures, in which like numerals indicate like elements, in which.

DETAILED DESCRIPTION

Figure 1:
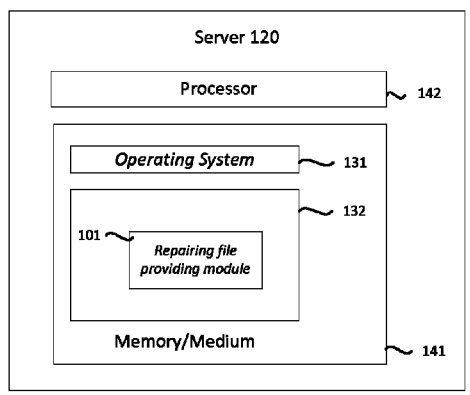
FIG. 1 is a schematic diagram illustrating an example of a file repairing system 10 according to an example of the present disclosure.
Figure 1:
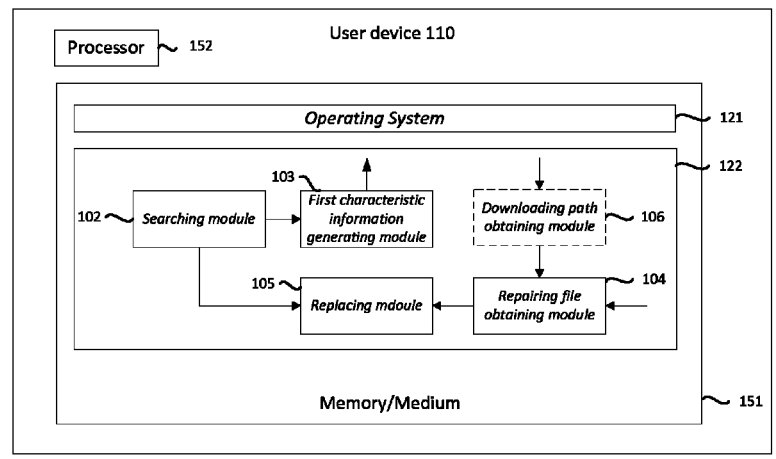

The preset disclosure will be described in further detail hereinafter with reference to accompanying drawings and examples to make the technical solution and merits therein clearer.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

In order to repair a defect file in a user device, conventional security software usually write relevant cleaning codes.

Since virus files may corrupt the user device in various kinds of manners, the security software has to write cleaning codes with respect to each kind of infective virus, which costs much time and labors.

Some virus files may tamper with much information of a file after the file in the user device is infected or may have a complex infecting manner. The security software is unable to repair the defect file or the repaired file cannot run, which affects normal usage of the file.

In order to make the repaired file runnable, some security software merely repairs a part that the virus tampers with but not deletes the virus itself. Although this repairing manner avoids harms of the virus to the user device, other security software may raise alarms with respect to the repaired file. This brings a bad experience to the user.

In various examples of the present disclosure, a server receives a virus file name from a user device. The server determines whether a defect file in the user device corrupted by a virus file corresponding to the virus file name can be repaired using the method of the present disclosure. If yes, the server finds, according to the virus file name, positions of the defect file that will not be modified by the virus file, generates an indication according to the positions and transmits the indication to the user device, such that the user device retrieves first characteristic information from the defect file according to the indication. The server receives the first characteristic information from the user device, compares the first characteristic information with second characteristic information of a repairing file. If they are consistent, the server provides a downloading path of the repairing file to the user device or directly provides the repairing file to the user device. Therefore, the user device can obtain the repairing file directly from the server or from a third party according to the downloading path. Then, the user device replaces the defect file with the repairing file.

In examples of the present disclosure, the defect file refers to a file infected with a virus, whereas the repairing file refers to a normal file which is not infected with virus.

Through replacing the defect file with the repairing file, the defect file in the user device may be repaired effectively, which does not require special virus cleaning algorithm to clean the virus file in the defect file. And it is not required to worry that the file cannot be used after the virus file is cleaned. Compared with conventional solutions which delete the virus attached at a file tail, the solution of the present disclosure is more effective and saves much time.

FIG. 1 is a schematic diagram illustrating an example of a file repairing system 10 which may execute the method of the present disclosure. As shown in FIG. 1, the file repairing system 10 includes: a repairing file providing module 101, a searching module 102, a first characteristic information generating module 103, a repairing file obtaining module 104 and a replacing module 105.

Specifically, the searching module 102, the first characteristic information generating module 103, the repairing file obtaining module 104 and the replacing module 105 may be deployed at a user device 110 and the repairing file providing module 101 may be deployed at a server 120.

The user device 110 may be a computing device capable of executing a method and apparatus of present disclosure. The user device 110 may, for example, be a device such as a personal desktop computer or a portable device, such as a laptop computer, a tablet computer, a cellular telephone, or a smart phone.

The user device 110 may include one or more non-transitory processor-readable storage media 151 and one or more processors 152 in communication with the non-transitory processor-readable storage media 151. The user device 110 may include or may execute an operating system 121 and an application 122 executable by a processor to implement the methods provided by the present disclosure.

The server 120 in FIG. 1 represents a computer system that is made available to the user device 110. The server 120 may include one or more non-transitory processor-readable storage media 141 and one or more processors 142 in communication with the non-transitory processor-readable storage media 141. The server 120 may include or may execute an operating system 131 and an application 132 executable by a processor to implement the methods provided by the present disclosure.

The non-transitory processor-readable storage media 151 and 141 may be a RAM memory, flash memory, ROM memory, EPROM memory, EEPROM memory, registers, hard disk, a removable disk, a CD-ROM, or any other form of non-transitory storage medium known in the art.

As shown in FIG. 1, the searching module 102, the first characteristic information generating module 103, the repairing file obtaining module 104 and the replacing module 105 may be program modules in the application 122 in the user device 110. The repairing file providing module 101 may be a program module in the application 132 in the server 120.

Hereinafter, functions and operations of the above program modules will be described in further detail respectively with reference to FIG. 1 to FIG. 4.

The searching module 102 searches the user device 110 for a defect file. If there is a defect file corrupted by a virus file in the user device 110, the searching module 102 obtains a virus file name of the virus file and transmits the virus file name to the server 120, such that the server 120 determines whether the defect file corrupted by the virus file corresponding to the virus file name can be repaired using the method provided by the present disclosure.

In this example, the determination of whether the defect file can be repaired using the method of the present disclosure refers to that, whether information on positions will not be modified by the virus file is enough to identify a repairing file corresponding to the defect file.

The positions which will not be modified by a virus file may be determined according to a following manner: analyzing the virus file to obtain the positions will not be modified by the virus file; determining whether the positions are enough to identify the repairing file and establishing a virus database. Data stored in the database may be as shown in Table 1.

TABLE 1

Data stored in the virus database of the server 120

Virus file name
Virus.Win32.Test.a

| Position index | Corresponding contents | remark |
| --- | --- | --- |
| Predefined position 1 | Copyright information | Not modify |
| Predefined position 2 | File name | Not modify |
| Predefined position 3 | Compiling time | Not modify |
| Predefined position 4 | File icon | modify |
| Predefined position 5 | Digital signature information | modify |
| Predefined position 6 | First 100 bytes before second section | modify |
| Predefined position 7 | First 100 bytes before third section | Not modify |
| Whether the defect file can be repaired by this method (whether the above positions will not be modified are enough to identify the original file) | | Yes |

According to the virus database, the server 120 is able to determine whether a defect file corrupted by a virus file can be repaired using the method of the present disclosure.

If determining that the defect file can be repaired, the server 120 transmits an indication to the user device 110, wherein the indication includes information of positions that will not be modified by the virus file corresponding to the virus file name. The positions may include copyright information, compiling time, file icon, digital signature information, etc. Otherwise, if determining that the defect file cannot be repaired, the server 120 may transmit information indicating that the defect file cannot be repaired to the user device 110. At this time, the user device 110 may repair the defect file using other methods.

For example, if the defect file can be repaired, as shown in Table 1, the server 120 transmits an indication including information of positions 1, 2, 3 and 7 to the user device 110.

The first characteristic information generating module 103 receives the indication transmitted by the server 120, retrieves relevant information from the defect file according to the indication, generates first characteristic information and transmits the first characteristic information to the server 120.

The first characteristic information may be first hash values of information on the positions of the defect file indicated by the indication.

The first characteristic information of the defect file is generated to obtain a repairing file corresponding to the defect file more accurately. Since there may be files with the same file name, a repairing file obtained merely according to the file name of the defect file may not correspond to the defect file. Thus, it is unable to repair the defect file. However, the first characteristic information is unique, i.e., files with the same contents have the same characteristic information. Thus, through obtaining the repairing file according to the first characteristic information of the defect file, the correctness of the repair file being obtained can be ensured.

After receiving the first characteristic information of the defect file, the server 120 may search a database for the repairing file according to the first characteristic information.

The repairing file obtaining module 104 obtains the repairing file corresponding to the first characteristic information through, e.g., transmitting a downloading request to the server 120 and receiving the repairing file directly from the server 120.

The replacing module 105 replaces the defect file with the repairing file. Through replacing the defect file with the repairing file, the defect file in the user device 110 may be repaired effectively, which does not require special virus cleaning algorithm to clean the virus file in the defect file. And it is not required to worry that the file cannot be used after the virus file is cleaned. Compared with conventional solutions which delete the virus attached at file tail, the solution of the present disclosure is more effective and saves much time.

As shown in FIG. 1, the user device 110 may further include a downloading path obtaining module 106 which obtains a downloading path (e.g. a Uniform/Universal Resource Locator (URL) address) of the repairing file from the server 120. At this time, the repairing file obtaining module 104 may also download the repairing file from a third party according to the downloading path. During the downloading process, a Peer to Peer (P2P) or a Peer to Server&Peer (P2SP) technique may be adopted, which may increase a downloading speed.

Figure 2:
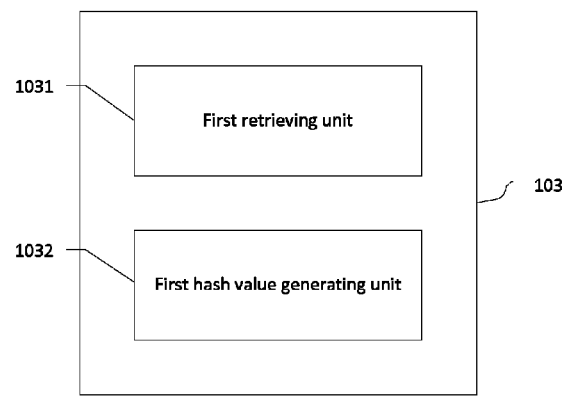
FIG. 2 is a schematic diagram illustrating a structure of a first characteristic information generating module 103 according to an example of the present disclosure.

FIG. 2 is a schematic diagram illustrating a structure of the first characteristic information generating module 103 in the user device 110 according to an example of the present disclosure. As shown in FIG. 2, the first characteristic information generating module 103 includes a first retrieving unit 1031 and a first hash value generating unit 1032.

The first retrieving unit 1031 retrieves information from the positions which will not be modified by the virus file in the defect file according to the indication.

The first hash value generating unit 1032 respectively generates a first hash value according to the information on each position of the defect file. In particular, the first hash value generating unit 1032 generates the first hash values according to a hash algorithm.

For example, if the indication includes information of positions 1, 2, 3 and 7 as shown in Table 1, the first retrieving unit 1031 retrieves copyright information, file name, compiling time and first 100 bytes before the third section of the defect file. The first hash value generating unit 1032 respectively generates a first hash value for each piece of the above information.

Then the first hash values may be transmitted to the server 120 to find the corresponding repairing file.

Now, the modules in the user device 110 have been described. Hereinafter, the server 120 will be described with reference to FIG. 3.

Figure 3:
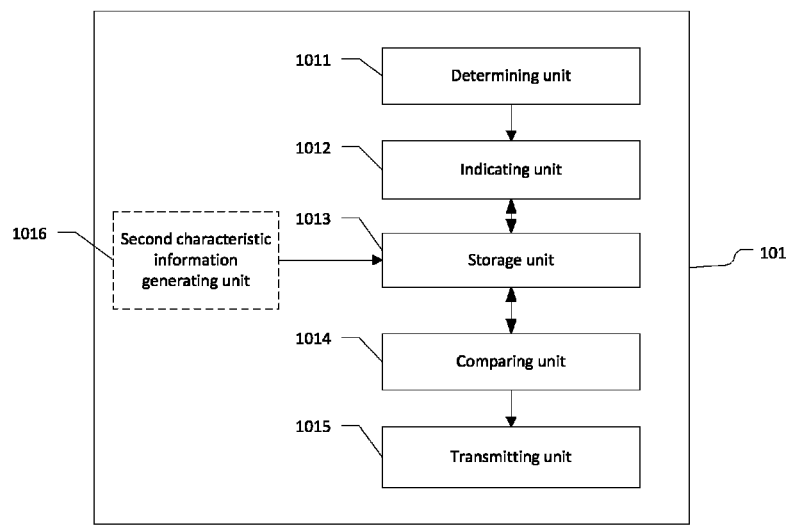
FIG. 3 is a schematic diagram illustrating a structure of a repairing file providing module 101 according to an example of the present disclosure.

FIG. 3 is a schematic diagram illustrating a structure of the repairing file providing module 101 in the server 120 according to an example of the present disclosure. As shown in FIG. 3, the repairing file providing module 101 includes: a determining unit 1011, an indicating unit 1012, a storage unit 1013, a comparing unit 1014 and a transmitting unit 1015.

The determining unit 1011 determines whether the defect file can be repaired according to the virus file name transmitted by the user device 110 and generates a determined result.

The indicating unit 1012 generates an indication and transmits the indication to the user device 110 if the determining unit 1011 determines that the defect file can be repaired.

Specifically, the indicating unit 1012 obtains the positions which will not be modified by the virus file from the storage unit 1013 (e.g., from the virus database as shown in Table 1) and generates the indication according to the positions.

In addition, if the determining unit 1011 determines that the defect file corrupted by the virus file corresponding to the virus file name transmitted by the user device 110 cannot be repaired, the indicating unit 1012 may transmit information indicating that the defect file cannot be repaired to the user device 110. After receiving the information, the user device 110 may repair the defect file using other methods.

The storage unit 1013 stores the repairing file, the virus database and second characteristic information of the repairing file.

The second characteristic information includes a Message Digest Algorithm 5 (MD5) value of the repairing file and second hash values of information on predefined positions of the repairing file. The MD5 value may be calculated according to the second hash values. The predefined positions as shown in Table 1 and Table 2 make the first characteristic information of the defect file and the second characteristic information of the repairing file comparable.

The second characteristic information of the repairing file may be as shown in Table 2.

TABLE 2

The second characteristic information stored in the storage unit 1013

| | MD5 value of repairing file 10DFDE204B724BDBDF59F5DEE0A52AA9 | |
|---|---|---|
| Position information | Corresponding contents | Hash value |
| Predefined position 1 | Copyright information | F40406 |
| Predefined position 2 | File name | 962F12 |
| Predefined position 3 | Compiling time | 2F1762 |
| Predefined position 4 | File icon | 06A0AF |
| Predefined position 5 | Digital signature information | 6C8B24 |
| Predefined position 6 | First 100 bytes before second section | 08AAF4 |
| Predefined position 7 | First 100 bytes before third section | 603AB8 |

The comparing unit 1014 receives the first characteristic information from the user device 110, compares the first characteristic information with the second characteristic information stored in the storage unit 1013 and generates a compared result. The comparing unit 1014 may compare the first hash values with the second hash values. The comparing unit 1014 may compare the first characteristic information with any one or any combination of the second hash values and the MD5 value of the second characteristic information.

The transmitting unit 1015 searches the storage unit 1013 for the corresponding repairing file if the comparing unit 1014 determines that the first characteristic information is consistent with the second characteristic information, and provides a downloading path of the repairing file to the user device 110 or provides the repairing file to the user device 110.

The repairing file providing module 101 may further include a second characteristic information generating unit 1016. The second characteristic information generating unit 1016 retrieves information from predefined positions of the repairing file, generates the second characteristic information, and records the second characteristic information in the storage module 1013.

Figure 4:
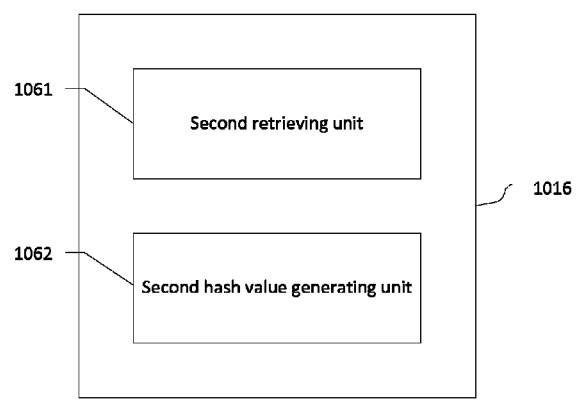
FIG. 4 is a schematic diagram illustrating a structure of a second characteristic information generating module 1013 according to an example of the present disclosure.

FIG. 4 is a schematic diagram illustrating a structure of the second characteristic information generating unit 1016 according to an example of the present disclosure. As shown in FIG. 4, the second characteristic information generating unit 1016 includes a second retrieving unit 1061 and a second hash value generating unit 1062.

The second retrieving unit 1061 retrieves information from the predefined positions of the repairing file.

The second hash value generating unit 1062 generates the second hash values according to the information.

Compared with conventional solutions, the present disclosure obtains the repairing file according to the first characteristic information of the defect file. Thus, the repairing file can be obtained accurately. The defect file in the user device may be directly replaced by the repairing file, which effectively repairs the defect file and it is not required to worry that the defect file cannot be used after the virus file is cleaned. In addition, it does not require any virus file cleaning algorithm. Thus, the solution of the present disclosure is more effective and saves much time.

In accordance with the above file repairing system 10, an example of the present disclosure further provides a method for repairing a file.

Figure 5:
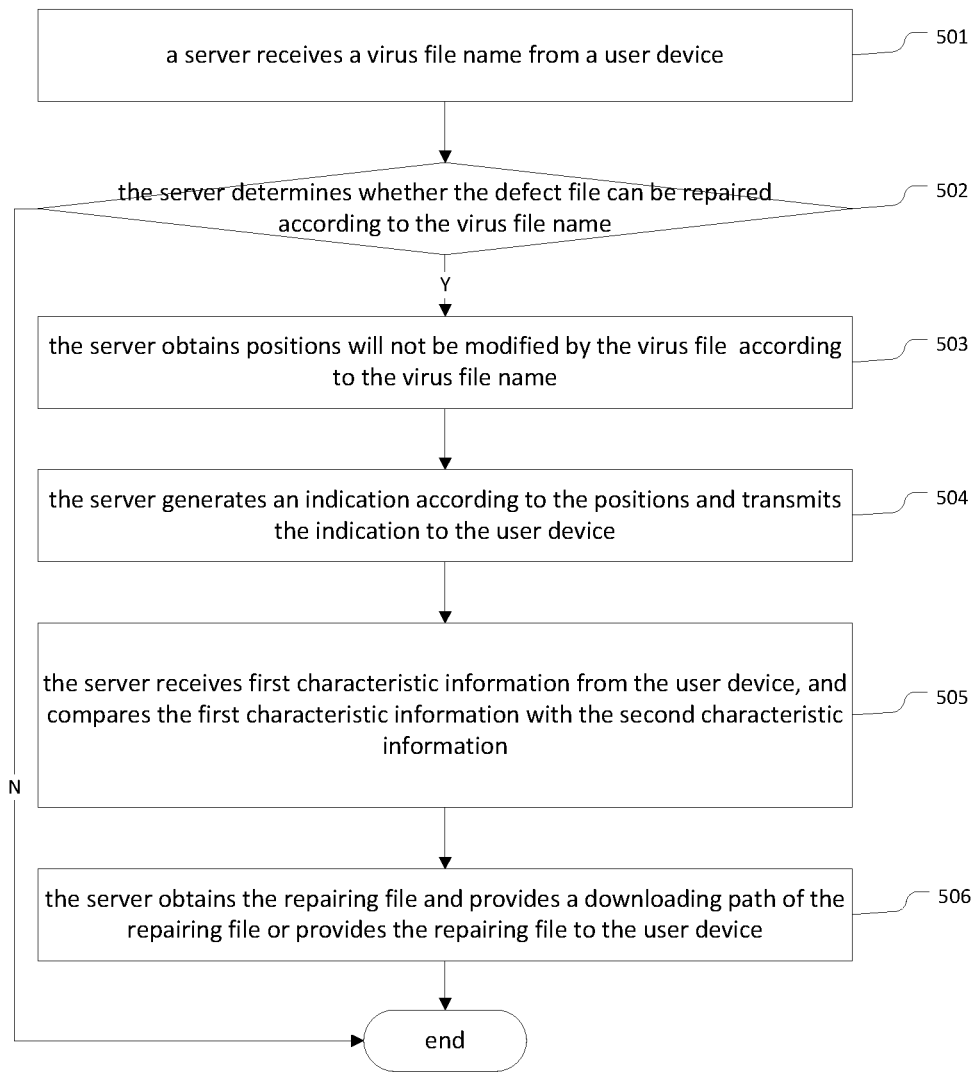
FIG. 5 is a flowchart illustrating a method for repairing a file according to an example of the present disclosure.

FIG. 5 is a flowchart illustrating a method for repairing a file at a server side according to an example of the present disclosure. FIG. 5 is a simplified diagram according to one embodiment of the present invention. This diagram is merely an example, which should not unduly limit the scope of the claims. One of ordinary skill in the art would recognize many variations, alternatives, and modifications.

As shown in FIG. 5, the method includes the following.

At block 501, a server receives a virus file name from a user device.

In particular, the user device may search itself for a defect file corrupted by a virus file, obtains a virus file name of the virus file and transmits the virus file name to the server.

At block 502, the server determines whether the defect file can be repaired according to the virus file name. If the defect file can be repaired, block 503 is performed; otherwise, the method ends.

At block 503, the server obtains positions will not be modified by the virus file according to the virus file name.

At block 504, the server generates an indication according to the positions and transmits the indication to the user device.

At block 505, the server receives first characteristic information from the user device, and compares the first characteristic information with second characteristic information of a repairing file. If they are consistent, block 506 is performed; otherwise, the method ends.

At block 506, the server obtains the repairing file and provides a downloading path of the repairing file or provides the repairing file to the user device.

Figure 6:
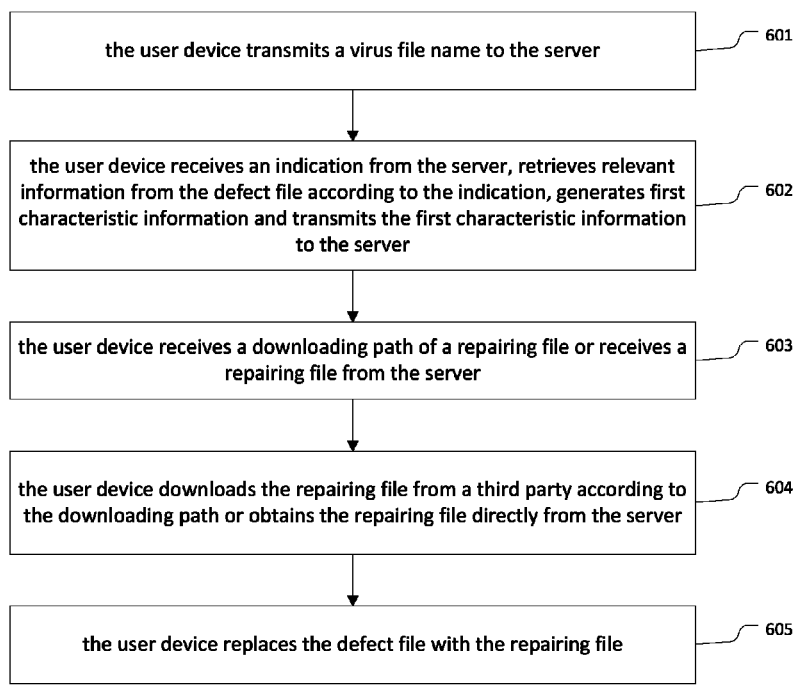
FIG. 6 is a flowchart illustrating a method for repairing a file according to an example of the present disclosure.

FIG. 6 is a flowchart illustrating a method for repairing a file at a user device side according to an example of the present disclosure. FIG. 6 is a simplified diagram according to one embodiment of the present invention. This diagram is merely an example, which should not unduly limit the scope of the claims. One of ordinary skill in the art would recognize many variations, alternatives, and modifications.

As shown in FIG. 6, the method includes the following.

At block 601, the user device transmits a virus file name to the server.

In particular, the user device may search itself for a defect file corrupted by a virus file, obtains a virus file name of the virus file and transmits the virus file name to the server.

At block 602, the user device receives an indication from the server, retrieves relevant information from the defect file according to the indication, generates first characteristic information and transmits the first characteristic information to the server. The indication includes information of positions will not be modified by the virus file.

At block 603, the user device receives a downloading path of a repairing file or receives a repairing file from the server.

At block 604, the user device downloads the repairing file from a third party according to the downloading path or obtains the repairing file directly from the server.

Specifically, the user device may transmit a downloading request to the server if the server determines that first characteristic information and the second characteristic information are consistent. In response to the downloading request, the server provides the repairing file to the user device.

At block 605, the user device replaces the defect file with the repairing file.

Through replacing the defect file with the repairing file, the defect file in the user device may be repaired effectively, which does not require special virus cleaning algorithm to clean the virus file in the defect file. And it is not required to worry that the file cannot be used after the virus file is cleaned. Compared with conventional solutions which delete the virus attached at file tail, the solution of the present disclosure is more effective and saves much time.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for repairing a file, comprising:
searching a user device for a defect file corrupted by a virus file;
obtaining, by the user device, a virus file name of the virus file and transmitting the virus file name to a server;
receiving, by the user device, information of positions of the defect file that will not be modified by the virus file transmitted by the server in response to the virus file name; wherein the positions comprises at least one of copyright information, file name, compiling time, file icon, digital signature information, and a position of a predetermined number of bytes in the defect file;
generating, by the user device, first characteristic information of the defect file according to the information of the positions and transmitting the first characteristic information to the server, the first characteristic information comprises first hash values of information on the positions of the defect file: wherein the server determines whether the first characteristic information of the defect file is same as second characteristic information of a repairing file, wherein the second characteristic information comprises second hash values of information on the positions of the repairing file: and the server obtains the repairing file when the first characteristic information is same as the second characteristic information; and
receiving, by the user device, the repairing file and replacing the defect file with the repairing file.

2. The method of claim 1, wherein
the generating the first characteristic information of the defect file according to the information of the positions comprises:
retrieving, by the user device from the defect file, information on the positions of the defect file corresponding to the information of the positions; and
calculating the first hash values according to the information retrieved.

3. The method of claim 1, wherein the receiving the repairing file comprises:
obtaining, by the user device, a downloading path of the repairing file from the server; and
downloading, by the user device, the repairing file according to the downloading path from a third party.

4. The method of claim 1, wherein the receiving the repairing file comprises:
transmitting, by the user device, a downloading request to the server; and
receiving, by the user device, the repairing file transmitted by the server in response to the downloading request.

5. A method for repairing a file, comprising:
receiving, by a server, a virus file name transmitted by a user device;
determining, by the server, whether a defect file corrupted by a virus file corresponding to the virus file name can be repaired according to the virus file name;
transmitting, by the server, information of positions of the defect file that will not be modified by the virus file to the user device when the defect file can be repaired; wherein the positions comprises at least one of copyright information, file name, compiling time, file icon, digital signature information, and a position of a predetermined number of bytes in the defect file;
receiving, by the server, first characteristic information of the defect file from the user device, wherein the first characteristic information comprises first hash values of information on the positions of the defect file;
determining, whether the first characteristic information is same as second characteristic information of a repairing file, wherein the second characteristic information comprises second hash values of information on the positions of the repairing file; and
providing, by the server, a downloading path of the repairing file or providing the repairing file to the user device, when the first characteristic information is same as the second characteristic information.

6. The method of claim 5, wherein the determining whether the defect file can be repaired according to the virus file name comprises:
determining, by the server, whether the information on the positions of the defect file will not be modified by the virus file is enough to identify the repairing file corresponding to the defect file;
determining, by the server, that the defect file can be repaired, when the information on the positions of the defect file will not be modified by the virus file is enough to identify the repairing file corresponding to the defect file.

7. The method of claim 5, further comprising:
retrieving, by the server, information from predefined positions of the repairing file; and
generating, by the server, the second characteristic information of the repairing file according to the retrieved information.

8. A user device for repairing a file, comprising:
one or more processors;
memory; and
one or more program modules stored in the memory and to be executed by the one or more processors, the one or more program modules comprise:
a searching module, to search the user device for a defect file corrupted by a virus file and obtain a virus file name of the virus file;
a first characteristic information obtaining module, to receive information of positions of the defect file that will not be modified by the virus file from a server and generate first characteristic information of the defect file, according to the information of the positions: wherein the positions comprises at least one of copyright information, file name, compiling time, file icon, digital signature information, and a position of a predetermined number of bytes in the defect file: the first characteristic information comprises first hash values of information on the positions of the defect file a repairing file obtaining module, to obtain a repairing file corresponding to the first characteristic information, wherein the repairing file is provided by the server when the first characteristic information of the defect file is same as second characteristic information of the repairing file; wherein the second characteristic information comprises second hash values of information on the positions of the repairing file; and a replacing module, to replace the defect file with the repairing file.

9. The user device of claim 8, wherein the first characteristic information obtaining module further comprises:

a first retrieving unit, to retrieve information on the positions corresponding to the information in the indication of the positions from the defect file; and a first hash value generating unit, to generate the first hash values according to the information retrieved.

10. The user device of claim 8, further comprising:

a downloading path obtaining module, to obtain a downloading path of the repairing file; and the repairing file obtaining module is further to download the repairing file according to the downloading path.

11. The user device of claim 8, wherein the repairing file obtaining module is further to transmit a downloading request to the server, and receive the repairing file transmitted by the server in response to the downloading request.

* * * * *